United States Patent
Demott et al.

(10) Patent No.: US 10,604,446 B2
(45) Date of Patent: Mar. 31, 2020

(54) PROCESS FOR THE PREPARATION OF HIGH ALUMINA CEMENT

(71) Applicant: KNAUF INSULATION, Vise (BE)

(72) Inventors: Gerard Demott, Majcichov (SK); Bostjan Marolt, Poljane (SI); David Ducarme, Wavre (BE)

( * ) Notice: Subject to any disclaimer, the term of this patent is extended or adjusted under 35 U.S.C. 154(b) by 195 days.

(21) Appl. No.: 15/545,991

(22) PCT Filed: Jan. 27, 2016

(86) PCT No.: PCT/EP2016/051731
§ 371 (c)(1),
(2) Date: Jul. 24, 2017

(87) PCT Pub. No.: WO2016/120347
PCT Pub. Date: Aug. 4, 2016

(65) Prior Publication Data
US 2018/0009710 A1    Jan. 11, 2018

(30) Foreign Application Priority Data
Jan. 27, 2015    (GB) .................................. 1501306.3

(51) Int. Cl.
| C04B 28/06 | (2006.01) |
| C04B 7/32 | (2006.01) |
| C04B 7/44 | (2006.01) |
| C04B 7/47 | (2006.01) |
| F27B 14/08 | (2006.01) |
| F27D 15/02 | (2006.01) |
| C04B 7/34 | (2006.01) |
| C04B 7/00 | (2006.01) |
| C04B 28/00 | (2006.01) |

(Continued)

(52) U.S. Cl.
CPC .............. *C04B 7/32* (2013.01); *C04B 7/4484* (2013.01); *C04B 7/475* (2013.01); *F27B 14/0806* (2013.01); *F27D 15/0206* (2013.01); *F27B 14/143* (2013.01); *F27B 2014/0837* (2013.01); *F27B 2014/104* (2013.01); *F27D 2027/002* (2013.01); *F27D 2099/0085* (2013.01)

(58) Field of Classification Search
CPC combination set(s) only.
See application file for complete search history.

(56) References Cited

U.S. PATENT DOCUMENTS

2004/0035330 A1*  2/2004  Oates ........................ C04B 7/30
                                                              106/795
2011/0236846 A1   9/2011  Rue et al.
(Continued)

FOREIGN PATENT DOCUMENTS

| CA | 2918656 A1 * | 2/2015 | ........... C03B 5/2356 |
| CN | 101811838 | 8/2010 | |

(Continued)

OTHER PUBLICATIONS

Wikipedia: "Calcium Aluminate Cements", Oct. 8, 2014 (Oct. 8, 2014), XP002755941, Retrieved from the internet: URL:https://en.wikipedia.org/wiki/Calcium_aluminate_cements (retrieved on Mar. 30, 2016) the whole document.

*Primary Examiner* — James E McDonough
(74) *Attorney, Agent, or Firm* — Knauf Insulation, Inc.; James K. Blodgett; Brandon N. Hudder

(57) ABSTRACT

High alumina cement is produced in a submerged combustion melter, cooled and ground.

15 Claims, 5 Drawing Sheets

(51) Int. Cl.
    *C04B 32/00*     (2006.01)
    *C04B 7/36*     (2006.01)
    *C04B 11/28*     (2006.01)
    *F27B 14/14*     (2006.01)
    *F27B 14/10*     (2006.01)
    *F27D 27/00*     (2010.01)
    *F27D 99/00*     (2010.01)

(56) References Cited

U.S. PATENT DOCUMENTS

2016/0159675 A1     6/2016    DeMott et al.
2016/0185642 A1     6/2016    DeMott et al.

FOREIGN PATENT DOCUMENTS

CN     101811838 B   *  9/2014
JP     2008303087     12/2008

* cited by examiner

PROCESS FOR THE PREPARATION OF HIGH ALUMINA CEMENT

CROSS-REFERENCE TO RELATED APPLICATIONS

This application is a U.S. national counterpart application of International Application Serial No. PCT/EP2016/051731, filed Jan. 27, 2016, under 35 U.S.C. § 371, which claims priority to GB Application. Serial No. 1501306.3, filed Jan. 27, 2015, the disclosures of which are hereby incorporated herein by reference.

FIELD OF THE INVENTION

The present invention relates to an improved process for the preparation of high alumina cement.

BACKGROUND OF THE INVENTION

High alumina cement, also called aluminous cement or calcium aluminate cement, is produced by fusing a mixture of limestone and bauxite at high temperatures comprised between 1400 and 1600° C., hence obtaining a melt which after cooling is ground to fine cement. The fusion may be performed in shaft furnaces, like blast furnaces, or in rotary kilns.

In typical formulations for the preparation of high alumina cement, the content of $SiO_2$ may vary from 0.4 to 10.0% by weight, Al2O3 may vary from 25 to 85% by weight and CaO from 15 to 50% by weight. High alumina cement may be used as hydraulic binder for the preparation of concrete intended for construction purposes or in the manufacture of refractory elements. It may also be mixed with other cements for the preparation of cement blends showing specific properties. High alumina cement is known for its rapid strength development.

The production of high alumina cement requires high energy inputs, and there is an ever increasing need for improvement of the energy efficiency of the manufacturing process.

Moreover, because of the highly corrosive nature of the raw materials and melt to be treated, the refractory lining of the furnaces in which the high alumina cement is treated needs to be repaired or replaced after relatively short time periods. There is hence a need to find a way to overcome that technical problem.

SUMMARY OF THE INVENTION

It has been found that high alumina cement may advantageously be prepared in a submerged combustion melter. The invention process hence comprises introducing solid batch material for preparation of high alumina cement into a melter, melting the solid batch material in the melter by submerged combustion, discharging a liquid melt, cooling said discharged liquid melt to obtain solidified melt and grinding the solidified melt to appropriate grain size. The grinding step is known to the person skilled in the art and may be adapted to product quality demand and requirements of the market place.

DETAILED DESCRIPTION OF THE INVENTION

Figure 1A:
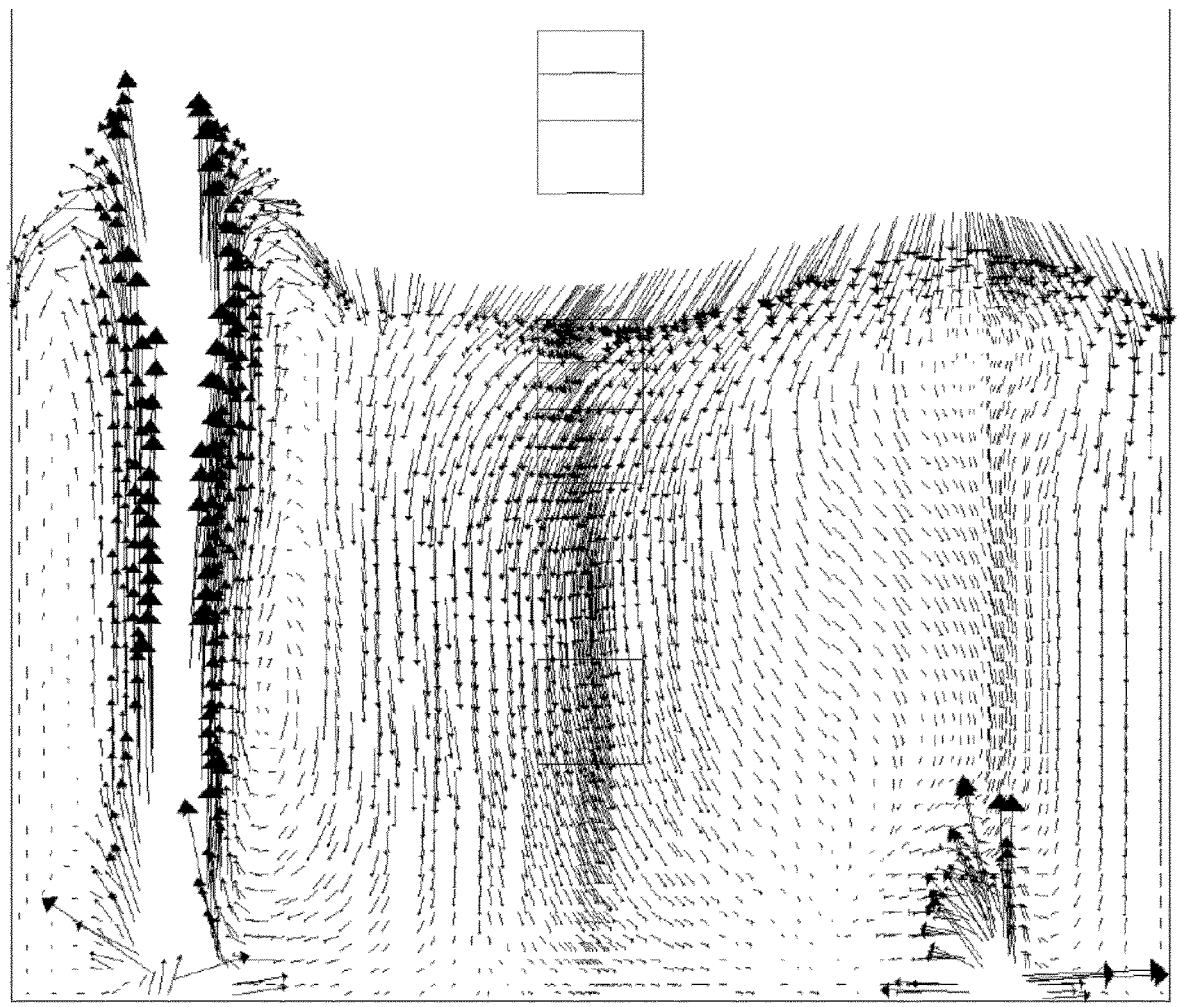
FIGS. 1a and 1b are schematic representations of a toroidal flow pattern in a submerged combustion melter.

The preparation of the high alumina cement may be carried out using a method and/or melter disclosed in any of WO 2015/014919, WO 2015/014920 or WO 2015/014921, each of which is hereby incorporated by reference.

Submerged combustion melters are known. These melters are characterized by the fact that they have one or more burner nozzles arranged below the surface of the melt, in a lance, in the melter walls and/or melter bottom, preferably in the melter bottom, such that the burner flame and/or combustion products pass through the melt and transfer energy directly to the melt.

Submerged combustion melters are known to generate high turbulence or agitation in the melt caused at least partially by the injection of combustion gas under high pressure into the melt and by the convective movements within the melt. The high turbulence ensures efficient mixing in the melt, and homogenizes the melt in terms of temperature profile and composition, leading to a high quality cement product. It also favors the absorption of raw material into the melt and improves heat transfer to fresh raw material. This reduces required residence time in the melter prior to withdrawal for downstream treatment. It is preferred, however, that the burners are controlled such that the melt volume is increased by at least 8%, preferably at least 10%, more preferably at least 15% or 20%, compared to the volume the melt would have with no burners firing. It is understood that the gas injection reduces the density of the melt, hence increases its volume, compared to what it would be when no gas is being injected.

In connection with the above, the melt volume (no submerged burners firing) may be calculated as a function of the temperature and the raw material batch composition. The level and hence volume of the agitated melt (submerged burners firing) may be measured with laser scanners or similar measuring devices that allow to measure and average melt level over a given period of time.

While submerged combustion has a tendency to cause foam formation at the top of the melt, that is over the melt level, it is preferable to operate the submerged combustion melter without foam or at reduced foam level, as the foam level may be disadvantageous with respect to the heat transfer.

Furthermore, the melting chamber walls are preferably cooled; for example, they may comprise double steel walls separated by circulating cooling liquid, preferably water. Particularly in the case of a cylindrical melting chamber, such assembly is relatively easy to build and is capable of resisting high mechanical stresses. A cylindrical shape of the melter facilitates balance of stresses on the outside wall. As the walls are cooled, for example water cooled, melt preferably solidifies and forms a protective layer on the inside of the melter wall. The melter assembly may not require any internal refractory lining and therefore needs less or less costly maintenance. In addition, the melt is not contaminated with undesirable components of refractory material normally eroded from an internal refractory lining. The internal face of the melter wall may advantageously be equipped with tabs or pastilles or other small elements projecting towards the inside of the melter. These may help in constituting and fixing a layer of solidified melt on the internal melter wall generating a lining having thermal resistance and reducing the transfer of heat to the cooling liquid in the double walls of the melter.

The melter may be equipped with heat recovery equipment. Hot fumes from the melter may be used to preheat raw material or the thermal energy contained in them may be recovered. Similarly, the thermal energy contained in the cooling liquid circulating between the two walls of the melter may also be recovered for heating or other purposes Overall the energy efficiency of submerged combustion melters is significantly improved compared to conventional shaft melters or rotary kilns.

The raw materials may be loaded through an opening in the melter wall, above the melt surface. Said opening may be opened and closed, for example by a piston, to minimize escape of heat and fumes. Raw material may be prepared and loaded into an intermediate chute and subsequently fall into the melter, in an opposite direction to escaping fumes, onto the melt surface. This countercurrent flow may advantageously preheat the raw materials. In the alternative, the raw materials may be charged below the level of the melt, by way of a screw feeder or a hydraulic feeder.

Melt may be withdrawn continuously or batch wise from the melter. Where raw material is loaded close to the melter wall, the melt outlet is preferably arranged opposite the material inlet. In a preferred embodiment of the invention, the melt is withdrawn through a discharge opening controlled by, for example, a ceramic piston. The piston may open or close a sliding door covering or uncovering the discharge opening.

The submerged burners preferably inject high pressure jets of combustion products into the melt that is sufficient to overcome the liquid pressure and to create forced upward travel of the flame and combustion products. The speed of the combustion and/or combustible gases, notably at the exit from the burner nozzle(s), may be 60 m/s, 100 m/s or 120 m/s and/or 350 m/s, 330 m/s, 300 or 200 m/s. Preferably the speed of the combustion gases is in the range of about 60 to 300 m/s, preferably 100 to 200, more preferably 110 to 160 m/s.

The temperature of the melt may advantageously be between 1400° C. and 1600° C.; it may be at least 1450° C. or 1480° C. and/or no more than 1600° C. or 1550° C. or 1520° C.

According to a preferred embodiment, the submerged combustion is performed such that a substantially toroidal melt flow pattern is generated in the melt, having a substantially vertical central axis of revolution, comprising major centrally inwardly convergent flows at the melt surface; the melt moves downwardly at proximity of the vertical central axis of revolution and is recirculated in an ascending movement back to the melt surface, thus defining an substantially toroidal flow pattern.

The generation of such a toroidal flow pattern ensures highly efficient mixing of the melt and absorption of raw material into the melt, and homogenizes the melt in terms of temperature profile and composition, thus leading to high quality final product.

Advantageously, the melting step comprises melting the solid batch material, in a submerged combustion melter by subjecting the melt to a flow pattern which when simulated by computational fluid dynamic analysis shows a substantially toroidal melt flow pattern in the melt, comprising major centrally inwardly convergent flow vectors at the melt surface, with the central axis of revolution of the toroid being substantially vertical.

At the vertical axis of revolution of said toroidal flow pattern, the flow vectors have a downward component reflecting significant downward movement of the melt in proximity of said axis. Towards the melter bottom, the flow vectors change orientation showing outward and then upward components.

Preferably the fluid dynamics model is code ANSYS R14.5, taking into consideration the multi-phase flow field ranging from solid batch material to liquid melt and gas generated in the course of the conversion, and the batch-to-melt conversion.

A toroidal melt flow pattern may be obtained using submerged combustion burners arranged at the melter bottom in a substantially annular burner zone imparting a substantially vertically upward directed speed component to the combustion gases. Advantageously, the burners are arranged with a distance between adjacent burners of about 250-1250 mm, advantageously 500-900 mm, preferably about 600-800, even more preferably about 650-750 mm. It is preferred that adjacent flames do not merge.

Each burner axis and/or a speed vector of the melt moving upwards over or adjacent to the submerged burners may be slightly inclined from the vertical, for example by an angle which is ≥1°, ≥2°, ≥3° or and/or which is ≤30°, preferably ≤15°, more preferably ≤10°, notably towards the center of the melter. Such an arrangement may improve the flow and directs melt flow away from the outlet opening and/or towards a center of the melter thus favoring a toroidal flow and incorporation of raw material in to the melt.

According to a one embodiment, each central burner axis is inclined by a swirl angle with respect to a vertical plane passing through a central vertical axis of melter and the burner center. The swirl angle may be ≥1°, ≥2°, ≥3°, ≥5° and/or ≤30°, ≤20°, ≤15° or ≤10°. Preferably, the swirl angle of each burner is about the same. Arrangement of each burner axis at a swirl angle imparts a slightly tangential speed component to the upward blowing flames, thus imparting a swirling movement to the melt, in addition to the toroidal flow pattern.

The burner zone is defined as a substantially annular zone. Burner arrangements, for example on an elliptical or ovoid line within the relevant zone are possible, but the burners are preferably arranged on a substantially circular burner line.

Preferably, the flow pattern comprises an inwardly convergent flow at the melt surface followed by a downwardly oriented flow in proximity of the central axis of revolution of the toroid. Said central axis of revolution advantageously corresponds to the vertical axis of symmetry of the melter. By axis of symmetry is meant the central axis of symmetry and, if the melter shows a transversal cross-section which does not have any single defined axis of symmetry, then the axis of symmetry of the circle in which the melter section is inscribed. The downwardly oriented flow is followed by an outwardly oriented flow at the bottom of the melter and a substantially annular upward flow at proximity of the burners, reflecting recirculation of melt toward the burner zone and in an ascending movement back to the melt surface, thus defining a substantially toroidal flow pattern.

The inwardly convergent flow vectors at the melt surface advantageously show a speed comprised between 0.1-3 m/s. The downward oriented speed vectors at proximity of the vertical central axis of revolution are preferably of significant magnitude reflecting a relatively high speed of material flowing downwardly. The downward speed vectors may be between 0.1-3 m/s. The melt and/or the raw materials within the melter, at least at one portion of the melter and notably at the melt surface (particularly inwardly convergent flow vectors at the melt surface) and/or at or proximate a vertical central axis of revolution, may reach a speed which is ≥0.1 m/s, ≥0.2 m/s, ≥0.3 m/s or ≥0.5 m/s and/or which is ≤2.5 m/s, ≤2 m/s, ≤1.8 m/s or ≤1.5 m/s.

The preferred toroidal flow pattern ensures highly efficient mixing and homogenizes the melt in terms of temperature profile and composition. It also favors the absorption of raw material into the melt and improves heat transfer to fresh raw material. This reduces required residence time in the melter prior to withdrawal, while avoiding or at least reducing the risk of raw material short cutting the melt circulation.

In one preferred embodiment, the burners are arranged at a distance of about 250-750 mm from the side wall of said melting chamber; this favors the preferred flow described above and avoids flame attraction to the melting chamber side walls. Too small a distance between burners and side wall may damage or unnecessarily stress the side wall. While a certain melt flow between burner and wall may not be detrimental and may even be desirable, too large a distance will tend to generate undesirable melt flows and may create dead zones which mix less with the melt in the center of the melter and lead to reduced homogeneity of the melt.

The distance between submerged burners is advantageously chosen such as to provide the desired toroidal flow pattern within the melt but also to avoid that adjacent flames merge. While this phenomenon depends on many parameters such as temperature and viscosity of the melt, pressure and other characteristics of the burners, it has been found advantageous to select a burner circle diameter comprised between about 1200 and 2000 mm. Depending on burner type, operating pressure and other parameters, too large a diameter will lead to diverging flames; too narrow a diameter will lead to merging flames.

Preferably at least 6 burners are provided, for example arranged on a burner circle line, more preferably 6 to 10 burners, even more preferably 6 to 8 burners, depending on the melter dimensions, burner dimensions, operating pressure and other design parameters.

Each burner or each of a plurality of a group of burners, for example opposed burners, may be individually controlled. Burners close to a raw material discharge may be controlled at different, preferably higher gas speeds and/or pressures than adjacent burners, thus allowing for improved heat transfer to the fresh raw material that is being loaded into the melter. Higher gas speeds may be required only temporarily, that is, in the case of batch wise loading of fresh raw material, just during the time period required for absorption of the relevant load into the melt contained in the melter. It may also be desirable to control burners that are located close to a melt outlet at a lower gas speed/pressure in order not to disturb the outlet of the melt.

The melting chamber is preferably substantially cylindrical in cross section; nevertheless, it may have an elliptical cross section or polygonal cross section showing more than 4 sides, preferably more than 5 sides.

It has been found that the melt for the preparation of high alumina cement shows a tendency to crystallize rather quickly. It may thus be desirable to discharge the melt quickly for downstream solidification and grinding. Such discharge may preferably be carried out through an outlet opening which may be opened and closed by a sliding door controlled by a piston.

The composition of the melt produced may typically comprise:

| | Possible melt composition (% weight) |
|---|---|
| $SiO_2$ | 4.0 |
| $Al_2O_3$ | 39.4 |
| CaO | 38.4 |
| $Fe_2O_3$ (total iron) | 16.4 |
| MgO | 1.0 |
| Na2O | 0.1 |
| K2O | 0.2 |
| TiO2 | 1.9 |
| other | Rest to 100% |

The discharged melt is allowed to cool at suitable temperature for storage and/or grinding. Grinding may be operated in several stages as is known per se. A first grinding step may break the cooled solidified melt particles down to a particle size suitable for supply into a grinder that will finally reduce the particle size such that 100% thereof pass a 90 μm screen in a dry circuit, possibly in several stages. Equipment for carrying out said grinding operations are known in the art.

Figure 1B:
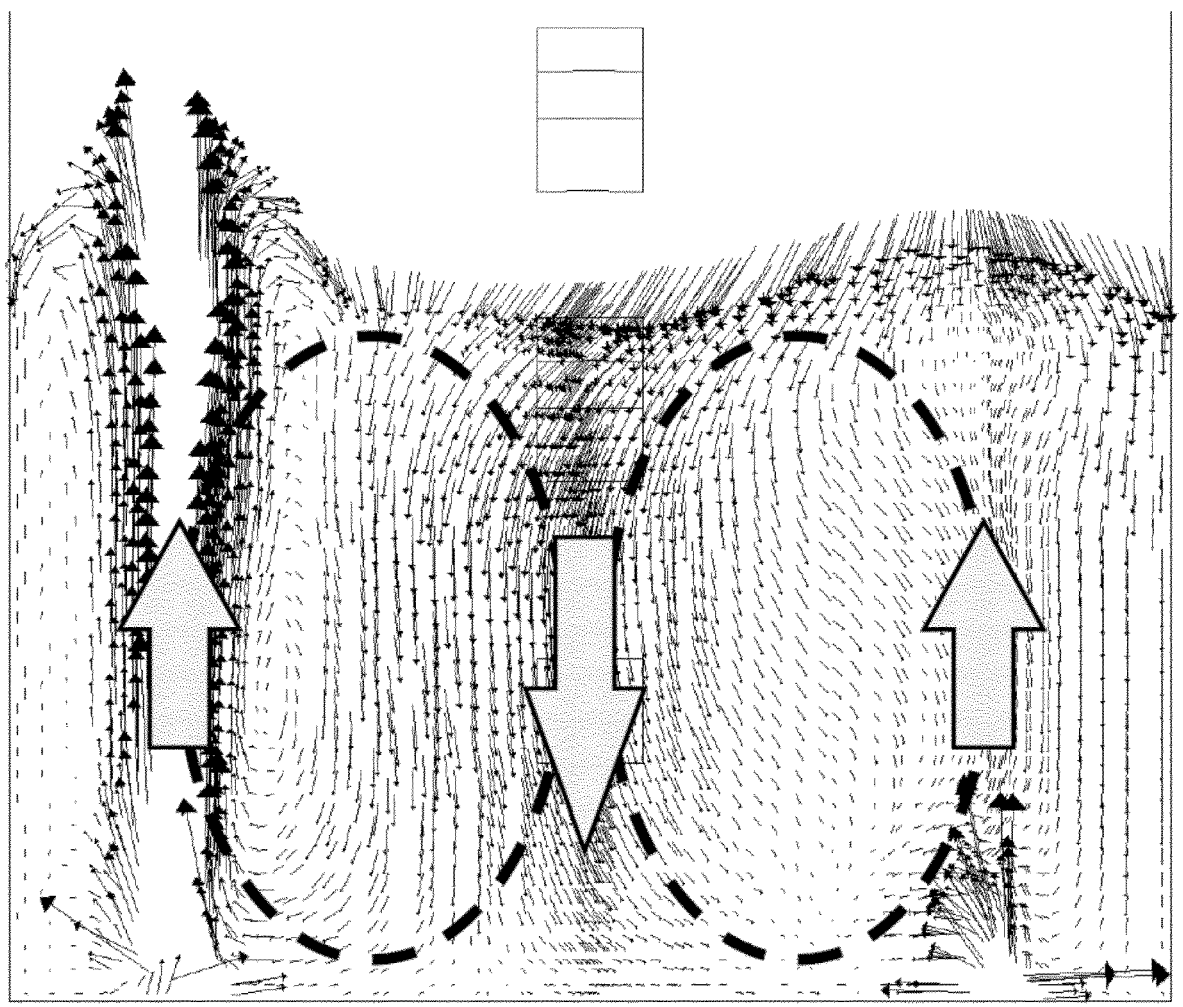
Figure 2:
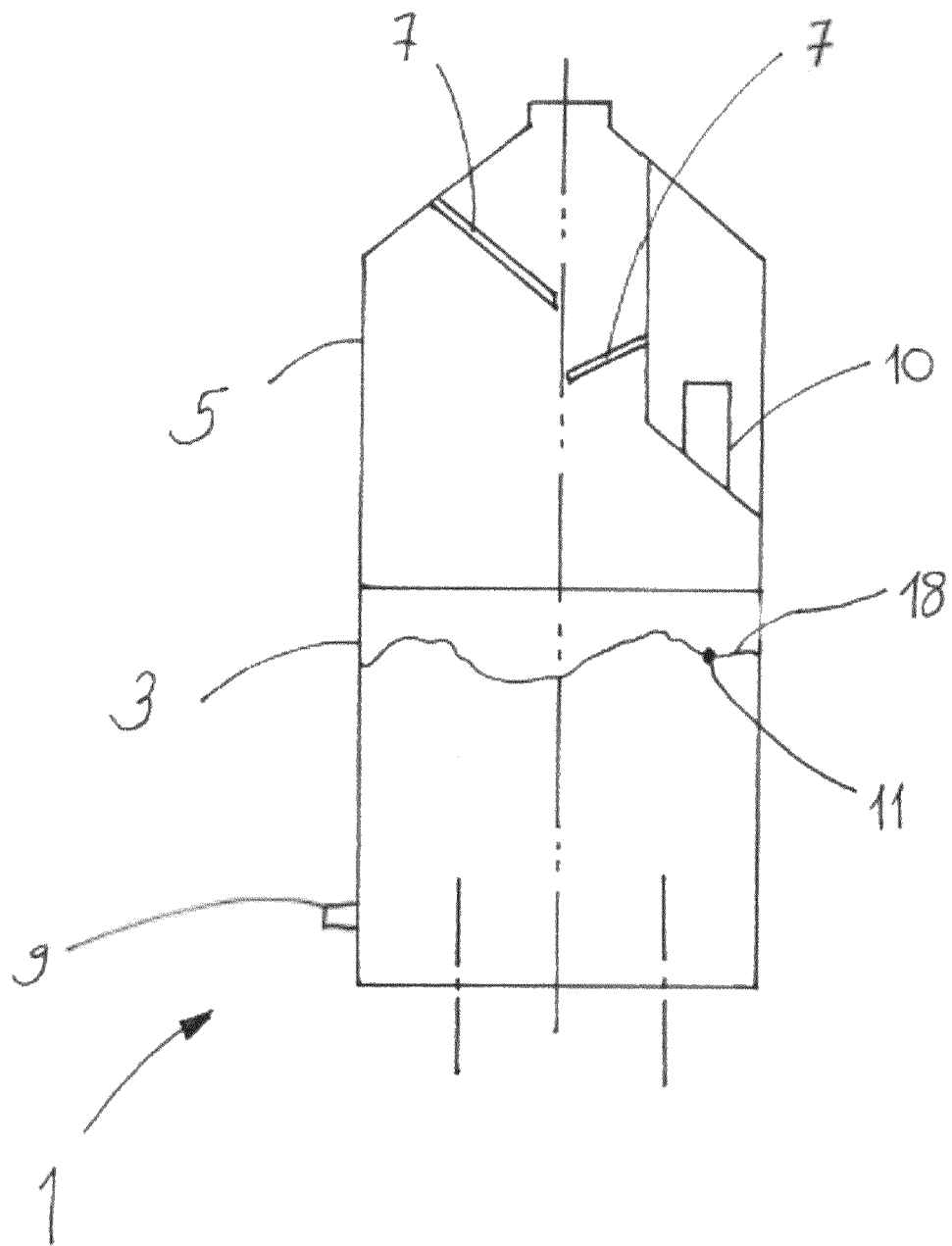
FIG. 2 shows a vertical section through a submerged combustion melter.
Figure 3:
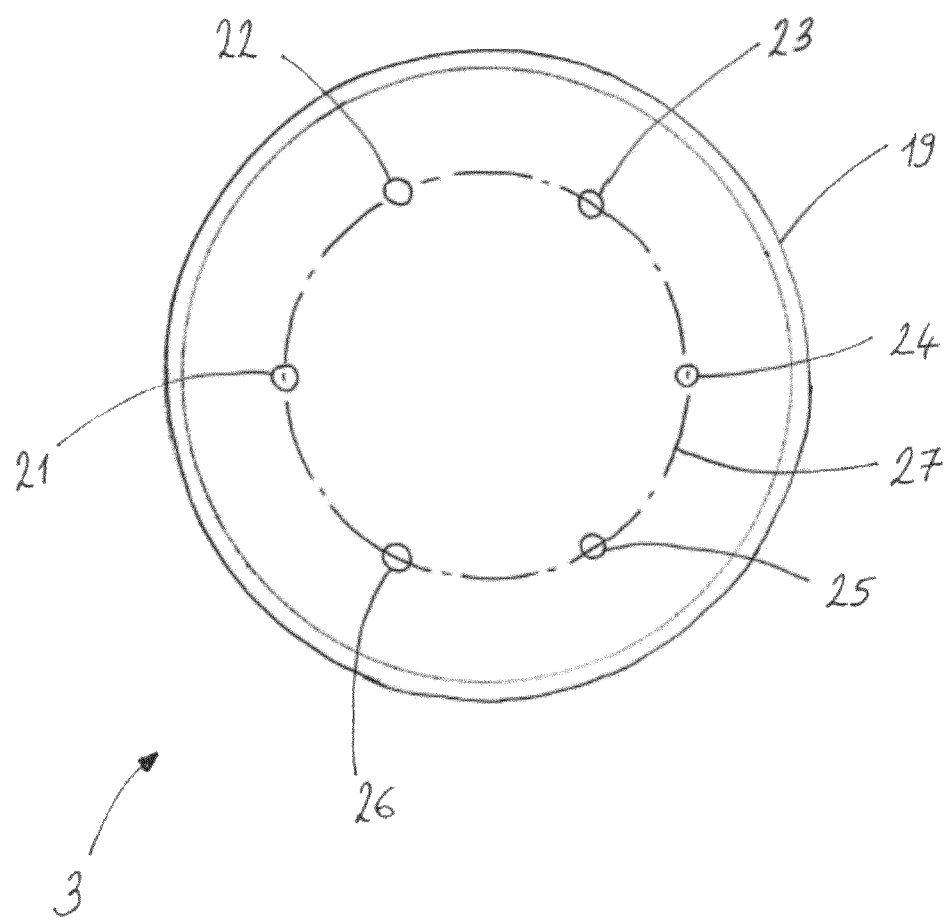
FIG. 3 is a schematic representation of a burnout layer for a melter of FIG. 2.
Figure 4:
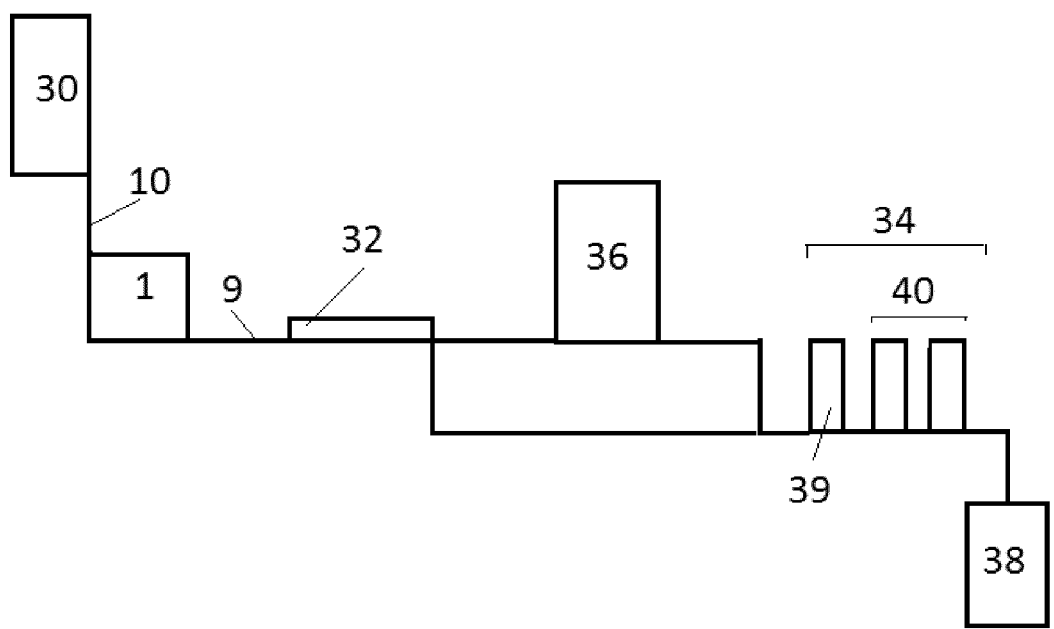
FIG. 4 schematically shows a production line according to the invention.

An embodiment of a melter suitable for use in accordance with the present invention is described below, with reference to the appended drawings of which:

FIGS. 1a and 1b are schematic representations of a toroidal flow pattern in a submerged combustion melter;

FIG. 2 shows a vertical section through a submerged combustion melter;

FIG. 3 is a schematic representation of a burner layout for a melter of FIG. 2; and FIG. 4 schematically shows a production line according to the invention.

With reference to the figures, a toroidal flow pattern is preferably established in which melt follows an ascending direction close to submerged burners 21, 22, 23, 24, 25, 26 which are arranged on a circular burner line 27, flows inwardly towards the center of the circular burner line at the melt surface, and flows downwards in the proximity of the said center. The toroidal flow generates agitation in the melt, ensures good stirring of the melt, and absorption of raw material into the melt. Furthermore, it has been determined that the flow as generated also reduces foam generation at the top of the melt; the gas or foam bubbles being entrained back into the melt, thus reducing its density.

The illustrated melter 1 comprises: a cylindrical melting chamber 3 having an internal diameter of about 2.0 m which contains the melt; an upper chamber 5; and a chimney for evacuation of the fumes. The upper chamber 5 is equipped with baffles 7 that prevent any melt projections thrown from the surface 18 of the melt being entrained into the fumes. A raw material feeder 10 is arranged at the upper chamber 5 and is designed to load fresh raw material into the melter 1 at a point 11 located above the melt surface 18 and close to the side wall of the melter. The feeder 10 comprises a horizontal feeding means, for example a feed screw, which transports the raw material mix to a hopper fastened to the melter, the bottom of which may be opened and closed by a vertical piston. The bottom of the melting chamber comprises six submerged burners 21, 22, 23, 24, 25, 26 arranged on a circular burner line 27 concentric with the melter axis and having a diameter of about 1.4 m. The melt may be withdrawn from the melting chamber 3 through a controllable outlet opening 9 located in the melting chamber side wall, close to the melter bottom, substantially opposite the feeding device 10. The melt withdrawn from the melter may then be allowed to cool and subsequently ground as required.

The temperature within the melt may be between 1400° C. and 1600° C., preferably 1450° C. and 1550° C., depending on the composition of the melt, desired viscosity and other parameters. Preferably, the melter wall is a double steel wall cooled by a cooling liquid, preferably water. Cooling water connections provided at the external melter wall allow a flow sufficient to withdraw energy from the inside wall such that melt can solidify on the internal wall and the cooling liquid, here water, does not boil. The internal melter wall is not lined with any refractory material.

The submerged burners 21,22,23,24,25,26 comprise concentric tube burners operated at gas flows of 100 to 200 m/s, preferably 110 to 160 m/s and generate combustion of fuel gas and oxygen containing gas within the melt. The combustion and combustion gases generate agitation within the melt before they escape into the upper chamber and then through the chimney. These hot gases may be used to preheat the raw material and/or the fuel gas and/or oxidant gas (e.g. oxygen, industrial oxygen have an oxygen content 95% by weight or oxygen enriched air) used in the burners. The fumes are preferably filtered prior to release to the environment, optionally using dilution with ambient air to reduce their temperature prior to filtering.

With reference to FIG. 4, raw material from a raw material storage 30 is charged into the furnace 1 as described above, and withdrawn thereof for cooling 32 and further downstream treatments known per se. The discharged melt is allowed to cool at a temperature suitable for further downstream operation, including grinding 34 to appropriate grain size and/or storing 36,38. The grinding is advantageously effected in several stages, including a first stage 39 that reduces the particle size of the solidified melt to a size suitable for downstream fine grinding 40 which in turn may be carried out in a manner known per se, in several stages, in order to reach a particle size as is common in the cement manufacturing industry. Mostly the final grain size is a powdery grain size. For example, it is such that 100% of the particles pass a 90 μm screen in a dry circuit. The production line further comprises dryers as appropriate and as is known per se; these devices have not been shown in the figures.

With respect to the exemplified melter, it has been found that the turbulent aerated melt showed almost no foam floating at the top of the melt, and it has been determined that the turbulent aerated melt showed a volume (averaged over a 1 minute time period) of 30-50% higher than that calculated on the basis of the raw material fed into the melter and maintained at the same temperature. The volume was.

The high alumina cement obtained is of high quality. The above described production process is less energy demanding then known processes, because of the choice of submerged combustion melters that allow for improved energy transfer to the melt, shorter residence times and thus less heat loss, and because the high stirring leads to a more homogenous melt at reduced melt viscosity, which in turn may allow for operation at reduced temperatures. Furthermore, submerged combustion may advantageously be performed in water-cooled melters which are easier and less costly to maintain and repair and which further allow for recycling of the energy withdrawn from the cooling fluid.

What is claimed is:

1. A process for the preparation of high alumina cement comprising:

introducing a solid batch material for preparation of high alumina cement into a melter comprising submerged burners and melting chamber walls;

melting the solid batch material in the melter by submerged combustion to form a liquid melt;

withdrawing at least a portion of the liquid melt from the melter;

cooling said discharged liquid melt to obtain a solidified melt; and grinding the solidified melt to appropriate grain size;

wherein the melting chamber walls are cooled using double steel walls separated by circulating cooling liquid and are not covered by a refractory lining.

2. The process of claim 1, wherein heat is recovered from the process.

3. The process of claim 2, wherein the recovered heat is used to preheat the raw materials.

4. The process of claim 1, wherein at least a part of the liquid melt is withdrawn continuously or batchwise from the melter.

5. The process of claim 1, wherein the submerged burners are controlled such that the melt volume is increased by at least 8% as compared to the volume the melt would have with no burners firing.

6. The process of claim 1, wherein the submerged combustion is performed such that a toroidal melt flow pattern is generated in the melt, having a vertical central axis of revolution, comprising major centrally inwardly convergent flows at the melt surface; wherein the melt moves downwardly at proximity of the vertical central axis of revolution and is recirculated in an ascending movement back to the melt surface for defining a toroidal flow pattern.

7. The process of claim 1, wherein the melting step comprises melting the solid batch material in a submerged combustion melter by subjecting the melt to a flow pattern which, when simulated by computational fluid dynamic analysis, comprises a toroidal melt flow pattern in the melt, comprising major centrally inwardly convergent flow vectors at the melt surface, and comprising a vertical central axis of revolution.

8. The process of claim 7, wherein towards the melter bottom, the flow vectors change orientation, showing outward and then upward components.

9. The process of claim 1, wherein the process is performed using production equipment comprising (i) a submerged combustion melter (1) comprising melting chamber (3) comprising melting chamber walls (19) and a melting chamber bottom, submerged burners (21, 22, 23, 24, 25, 26), and equipped with a raw material discharge (10) or feeder and melt outlet (9), (ii) a melt cooling station and (iii) a grinding station.

10. The process of claim 9, wherein the melting chamber walls (19) are cooled using double steel walls separated by circulating cooling liquid, and are not covered by a refractory lining.

11. The process of claim 9, wherein the submerged combustion burners (21, 22, 23, 24, 25, 26) are arranged at the melter bottom in an annular burner zone.

12. The process of claim 9, wherein the submerged combustion burners (21, 22, 23, 24, 25, 26) are arranged with a distance between adjacent burners of about 250-1250 mm.

13. The process of claim 9, wherein each burner axis and/or a speed vector of the melt moving upwards over or adjacent to the submerged burners (21, 22, 23, 24, 25, 26) is slightly inclined from the vertical at an angle of greater than or equal to 1° and/or less than or equal to 30° towards the center of the melter.

14. The process of claim 9, wherein each central burner axis is inclined by a swirl angle of greater than or equal to 1° and/or less than or equal to 30° with respect to a vertical plane passing through a central vertical axis of the melter and the burner center.

15. The process of claim 1, wherein heat is recovered from the cooling liquid.

* * * * *